May 23, 1967 S. SCHERTLER 3,321,174
GATE SLIDE VALVE
Filed April 1, 1964
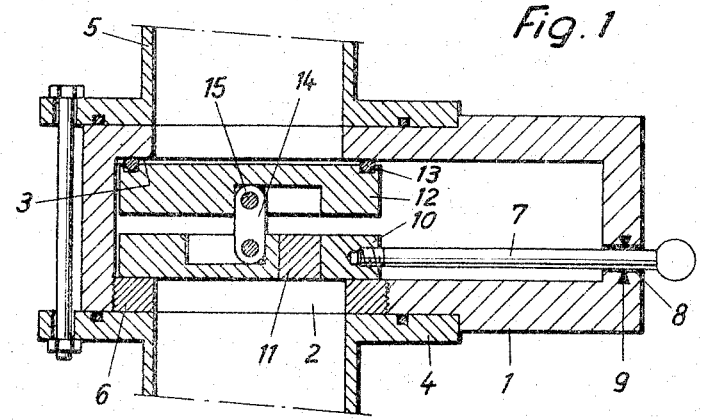
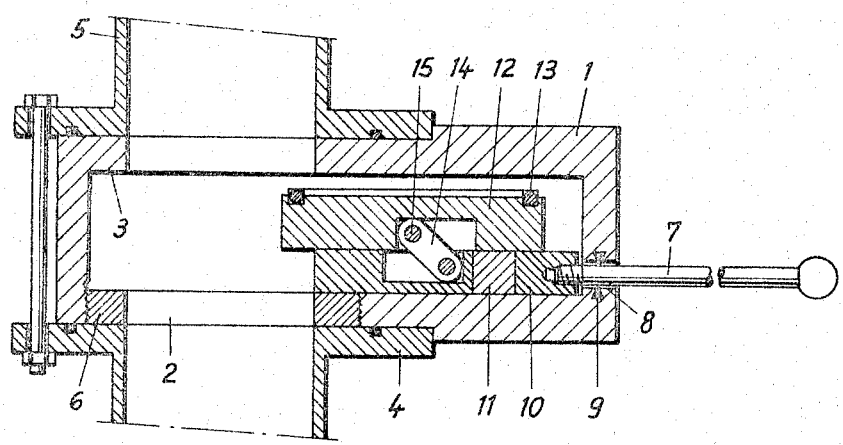
INVENTOR:
SIEGFRIED SCHERTLER
by
Arthur O. Klein
his Attorney

United States Patent Office 3,321,174
Patented May 23, 1967

3,321,174
GATE SLIDE VALVE
Siegfried Schertler, 9 Untergasse, Flawil,
Saint Gall, Switzerland
Filed Apr. 1, 1964, Ser. No. 356,376
Claims priority, application Austria, Apr. 2, 1963,
A 2,653/63
6 Claims. (Cl. 251—65)

The present invention relates to a gate slide valve having an gate slide assembly, which comprises two elements articulated to one another by a toggle lever and is slidable in the slide valve casing by means of an actuator member from an open position to a closed position and vice versa, being pressed automatically in the closed position by said toggle lever on opposite seats surrounding the connection ports of said casing.

It is a primary object of my invention to provide a gate slide valve of the kind referred to, which is of compact construction, which can be produced economically, has only a short structural length and seals well. It is another object of my invention to dispense with a valve casing consisting in two parts, which either have to be screwed to one another with a gasket interposed, after the insertion of the said gate slide assembly, which is time wasting, expensive and does not ensure a good seal, or has to be fabricated by welding said two parts together after the insertion of said gate slide assembly, which ensures a good seal, but is a tricky operation and does not allow the dismantling of the slide valve.

With these and other objects in view which will become apparent later from this specification and the accompanying drawing, I provide a gate slide valve comprising in combination: a one-piece casing, a gate slide assembly slidably mounted in said casing, said gate slide assembly comprising two elements, a toggle lever pivotally attached to said two elements and an actuator member connected with said gate slide assembly and in operation moving the same between an open position and a closed position in said casing, said casing having connection ports, a seat surrounding one of said ports on the inside of said casing, and an annular valve seat detachably mounted in one of said connection ports, the aperture of the latter being large enough for the insertion into and withdrawal from said casing of said gate slide assembly through said aperture.

Preferably said annular valve seat has an external screw thread and said connection port associated with it has an internal screw head, the closure pressure of said elements on their seats being adjustable by screwing said annular valve seat more or less deeply into said casing.

A permanent magnet may be mounted on one of said elements, holding in the open position of said gate slide assembly said two elements firmly upon one another.

One of said elements may form a slider attached to said actuator member, and the other one of said elements may form a slide plate, which is slidable relative to said slider and has a seal, said seal being compressed between said slide plate and its associated seat on said casing in the closed position of said aggregate.

These and other features of my said invention will be clearly understood from the following description of an embodiment thereof given by way of example with reference to the accompanying drawing, in which:

FIG. 1 is a section of a closed slide valve,
FIG. 2 of the open slide valve.

In both FIG. 1 and FIG. 2 the slide valve is illustrated as built in between the flanges of a pipe line.

The casing 1 has an enlarged connection opening 2 at the connection side, in which a screw-threaded ring 6 is screwed and through which the gate slide assembly is inserted, which consists of the components 10, 12, 14.

The screw-threaded ring 6 serves at the same time as a closure and as an adjustable seat for the gate slide assembly, in order to vary the closure pressure on the seat 6. The slide valve rod 7 is introduced through a bore 8 and is connected with the said gate slide assembly. 9 is a seal between the rod and casing. The gate slide assembly is built up on the slide body 10, which is rigidly connected with the slide rod 7.

A permanent magnet 11 is firmly pressed in the slide body, which magnet keeps the slide gate 12 in the open gate position on the slide body. 13 is a gate seal. A toggle lever 14 is pivotally attached on the one hand on the slide body 10 and on the other hand on the gate 12 by means of pins 15. By shifting the gate slide assembly towards the connection openings the slide body is displaced relative to the slide gate, so that a toggle lever effect is attained, which causes the compression of the seal 13 between the seat 3 and the gate 12.

In order to attain centering of the slide body relative to the pipe line flanges 4, 5, the connection faces of the latter are recessed into the casing.

Obviously, instead of the slide valve rod, another device would be conceivable, which moves the gate slide assembly within the casing.

While I have thus described herein and illustrated in the accompanying drawings what may be considered a typical and particularly useful embodiment of my said invention, I wish it to be understood that I do not limit myself to the details and dimensions described or illustrated; for obvious modifications will occur to a person skilled in the art.

What I claim as my invention and desire to secure by Letters Patent is:

1. A gate slide valve, comprising in combination, a valve housing, a gate slide assembly slidably mounted in said housing, said assembly comprising two slide elements, means operatively connected to said two slide elements and adapted to selectively spread said two elements apart, an actuator member connected to said gate slide assembly and adapted to operatively move the same between a closed position and an open position in said housing, said housing having inlet and outlet ports at opposite sides thereof, a valve seat surrounding one of said ports inside said housing, the other one of said ports having at least a portion which is internally threaded, an annular valve seat having an external screw thread being threadably axially mounted in said threaded portion and being adapted to adjust the closing position of said gate slide assembly with respect to the other valve seat by being threadably axially positioned more or less deeply into said valve housing.

2. A gate slide valve as claimed in claim 1, comprising a permanent magnet mounted on one of said slide elements and in the open position of said gate slide assembly holding said two slide elements firmly upon one another.

3. A gate slide valve as claimed in claim 1, wherein one of said slide elements forms a slider attached to said actuator member and the other one of said slide elements forms a slide plate which is slidable relative to said slider and has a seal, said seal being compressed between said slide plate and its associated valve seat on said housing in the closed position of said assembly.

4. The gate slide valve as set forth in claim 1, wherein said valve housing consists of a one-piece casing.

5. The gate slide valve as set forth in claim 1, wherein said annular valve seat defines an opening sufficiently large to permit the insertion and withdrawal of said gate slide assembly from said valve housing through said opening without requiring the disassembling of said gate slide assembly.

6. The gate slide valve as set forth in claim 1, wherein said means operatively connected to said two slide elements comprise a toggle lever pivotally connected to said two slide elements.

References Cited by the Examiner
UNITED STATES PATENTS

| | | | |
|---|---|---|---|
| 2,850,268 | 9/1958 | Perazone | 251—169 |
| 3,026,903 | 3/1962 | Roach | 251—65 X |
| 3,112,095 | 11/1963 | Batzer | 251—204 X |

FOREIGN PATENTS 1,141,242   3/1957   France.

WILLIAM W. O'DEA, *Primary Examiner.*

H. W. WEAKLEY, *Assistant Examiner.*